(12) United States Patent
Subrahmanyam et al.

(10) Patent No.: US 7,945,761 B2
(45) Date of Patent: May 17, 2011

(54) MAINTAINING VALIDITY OF CACHED ADDRESS MAPPINGS

(75) Inventors: Pratap Subrahmanyam, Saratoga, CA (US); Vyacheslav Malyugin, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/829,884

(22) Filed: Jul. 2, 2010

(65) Prior Publication Data

US 2010/0274987 A1 Oct. 28, 2010

Related U.S. Application Data

(62) Division of application No. 11/561,989, filed on Nov. 21, 2006, now abandoned.

(51) Int. Cl.
*G06F 12/00* (2006.01)
(52) U.S. Cl. ............... 711/206; 711/6; 711/E12.068
(58) Field of Classification Search .............. 711/6, 207, 711/E12.065, E12.068
See application file for complete search history.

(56) References Cited

U.S. PATENT DOCUMENTS

| | | | |
|---|---|---|---|
| 6,075,938 A * | 6/2000 | Bugnion et al. ............... | 703/27 |
| 6,356,989 B1 * | 3/2002 | Hays et al. .................... | 711/205 |
| 7,386,669 B2 | 6/2008 | Dombrowski et al. | |
| 2004/0068618 A1 | 4/2004 | Hooker | |
| 2006/0026384 A1 | 2/2006 | Brandt et al. | |
| 2006/0259732 A1 * | 11/2006 | Traut et al. .................... | 711/173 |
| 2006/0259734 A1 * | 11/2006 | Sheu et al. .................... | 711/203 |
| 2007/0067602 A1 * | 3/2007 | Callister et al. ............... | 711/207 |
| 2008/0010442 A1 | 1/2008 | Hochschild et al. | |
| 2008/0282241 A1 | 11/2008 | Dong | |

* cited by examiner

*Primary Examiner* — Shane M Thomas

(57) ABSTRACT

A method is provided for creating and maintaining the validity of a cache group including one or more cache elements. Each of the cache elements corresponds to a different address space in a virtual memory of a computer system. Each of the cache elements include one or more caches that store mappings from virtual addresses to data or values that are functions of or dependent upon physical addresses that correspond to the virtual addresses. When there is an address space switch from a first address space to a second address space, the cache group is searched to find the cache element corresponding to the second address space, and that found cache element is made the current cache element for virtual memory access through the cache element. Changes in the page tables are also detected and reflected in the caches of the cache group to maintain the caches up-to-date.

18 Claims, 10 Drawing Sheets

| Page Table Identifier 702 | Page Entries Set 704 | Dependent TLB Set 706 |

FIG. 7A

| Address of Page (4 Bytes) 702 | Page Entries Vector (1024 Bits) 704 | Dependent Set Vector (32 Bits) 706 | |
|---|---|---|---|
| 0x1abcd000 | 1000010...0000000 | 010010...000000 | Entry 0 |
| 0x3fe45000 | 0010010...0000000 | 000100...000000 | Entry 31 |

MAINTAINING VALIDITY OF CACHED ADDRESS MAPPINGS

CROSS-REFERENCE TO RELATED APPLICATION(S)

This application claims the benefit of U.S. patent application Ser. No. 11/561,989, filed on 21 Nov. 2006, entitled "MULTIPLE CACHE ELEMENTS FOR ADDRESS SPACE SWITCHING".

BACKGROUND OF THE INVENTION

1. Field of the Invention

This invention relates generally to computer systems using virtual memory and, in particular, to a method and system for maintaining the validity of cached address mappings.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Figure 1:
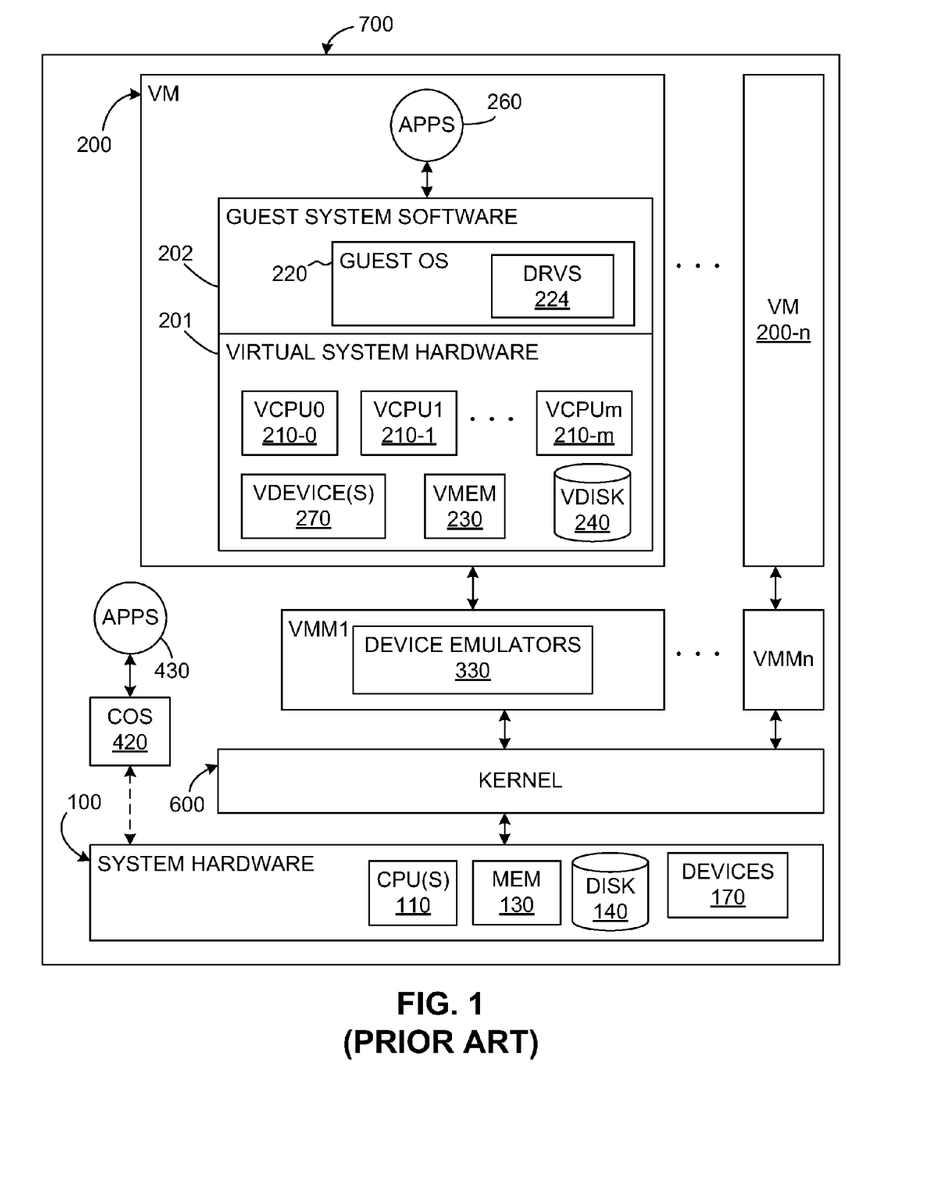
FIG. 1 illustrates a non-hosted virtualized system.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software. Moreover, the invention is described below as having a VMM; this is by way of example only, since the invention is not restricted to any particular type of VMM or "hypervisor," etc.

Moreover, FIG. 1 shows virtual machine monitors that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Figure 2:
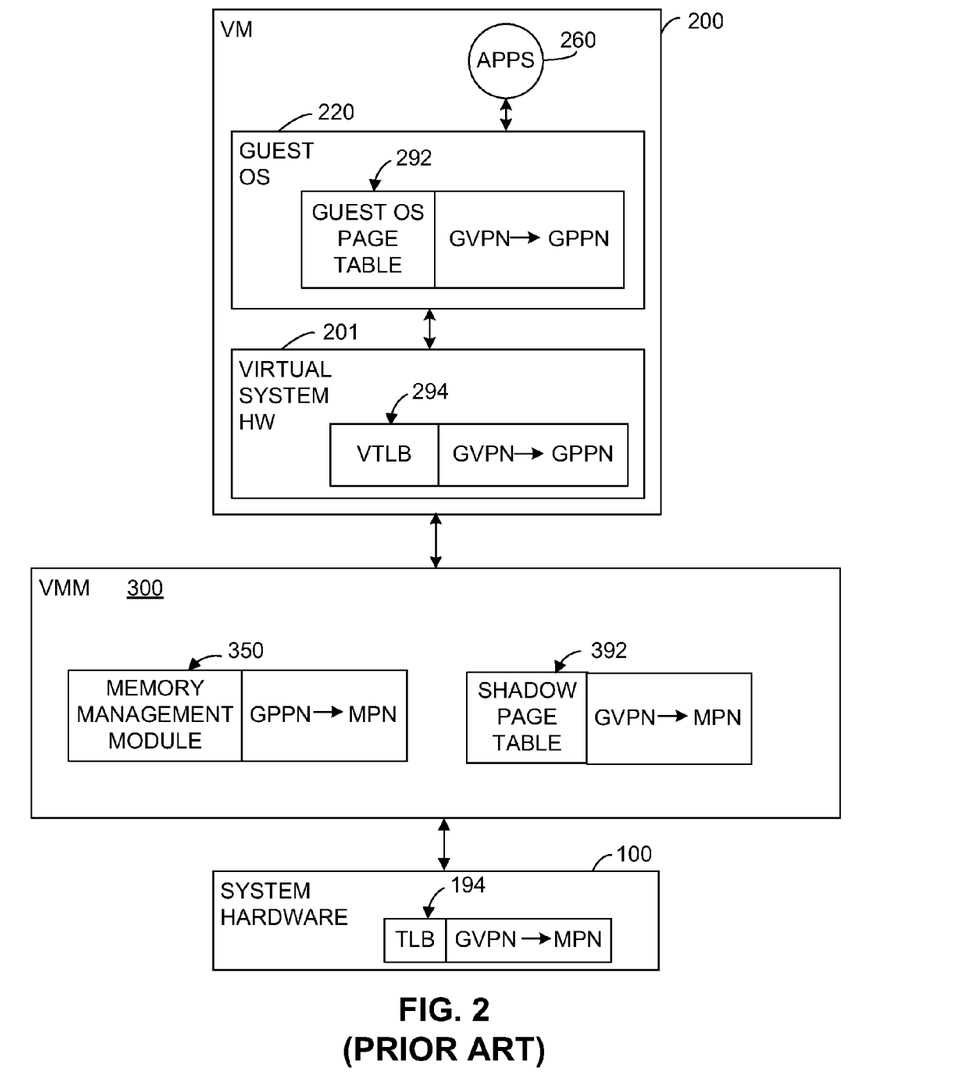
FIG. 2 illustrates virtual memory management and address mapping functions performed by the virtual machine monitor and other various components of the virtualized computer system.

In order to more efficiently utilize memory resources in a computer system, virtual memory is often used. For example, FIG. 2 illustrates virtual memory management and address mapping functions performed by the VMM 300 and other various components of a virtualized computer system. The guest OS 220 generates a guest OS page table 292. The guest OS page table 292 contains mappings from GVPNs (Guest Virtual Page Numbers) to GPPNs (Guest Physical Page Numbers). Suppose that a guest application 260 attempts to access a memory location having a first GVPN, and that the guest OS 220 has specified in the guest OS page table 292 that the first GVPN is backed by what it believes to be a physical memory page having a first GPPN. The mapping from the first GVPN to the first GPPN is used by the virtual system hardware 201, and it is loaded into a VTLB (Virtual Translation Look-Aside Buffer) 294 which operates as a cache for the frequently accessed mappings from the GVPN to the GPPN.

A virtualized computer system typically uses a second level of address indirection to convert what the guest OS treats as a "real" address in physical memory into an address that in fact is an address in the hardware (physical) memory. The memory management module 350 translates the first GPPN into a corresponding actual PPN (Physical Page Number), which, in some literature, is equivalently referred to as an MPN (Machine Page Number). This translation is typically carried out by a component such as a so-called Bus-Mem/PhysMem table, which includes mappings from guest physical addresses to bus addresses and then to physical (hardware or "machine") addresses. The memory management module 350 creates a shadow page table 392, and inserts a translation into the shadow page table 392 mapping the first GVPN to the first PPN. In other words, the memory management module 350 creates shadow page tables 392 that function as a cache containing the mapping from the GVPN to the PPN. This mapping from the first GVPN to the first PPN is used by the system hardware 100 to access the actual hardware storage device that is backing up the GVPN, and is also loaded into the TLB (Translation Look-Aside Buffer) 194 to cache the GVPN-to-PPN mapping for future memory access.

Note that the concept of "virtual memory" is found even in non-virtualized computer systems, where "virtual page numbers" are converted into "physical page numbers." One effect of the second level of address indirection introduced in a virtualized computer system is thus that the guest physical page numbers, which the guest OS thinks refer directly to hardware are in fact treated by the underlying host OS (or similar system-level component) as virtual page numbers, which are again remapped into hardware memory. To avoid any confusion that might result from the terms "virtual memory" and "virtual page number," etc., being used even in literature describing non-virtualized computer systems, and to keep terminology as consistent as possible with convention, GVPNs and GPPNs refer here to the page numbers generated within the guest, and PPNs or, equivalently, MPNs, are the page numbers for pages in hardware (machine) memory. Finally, note that the base address of a page is computed by multiplying the page number of the page by the size of the page.

Figure 3:
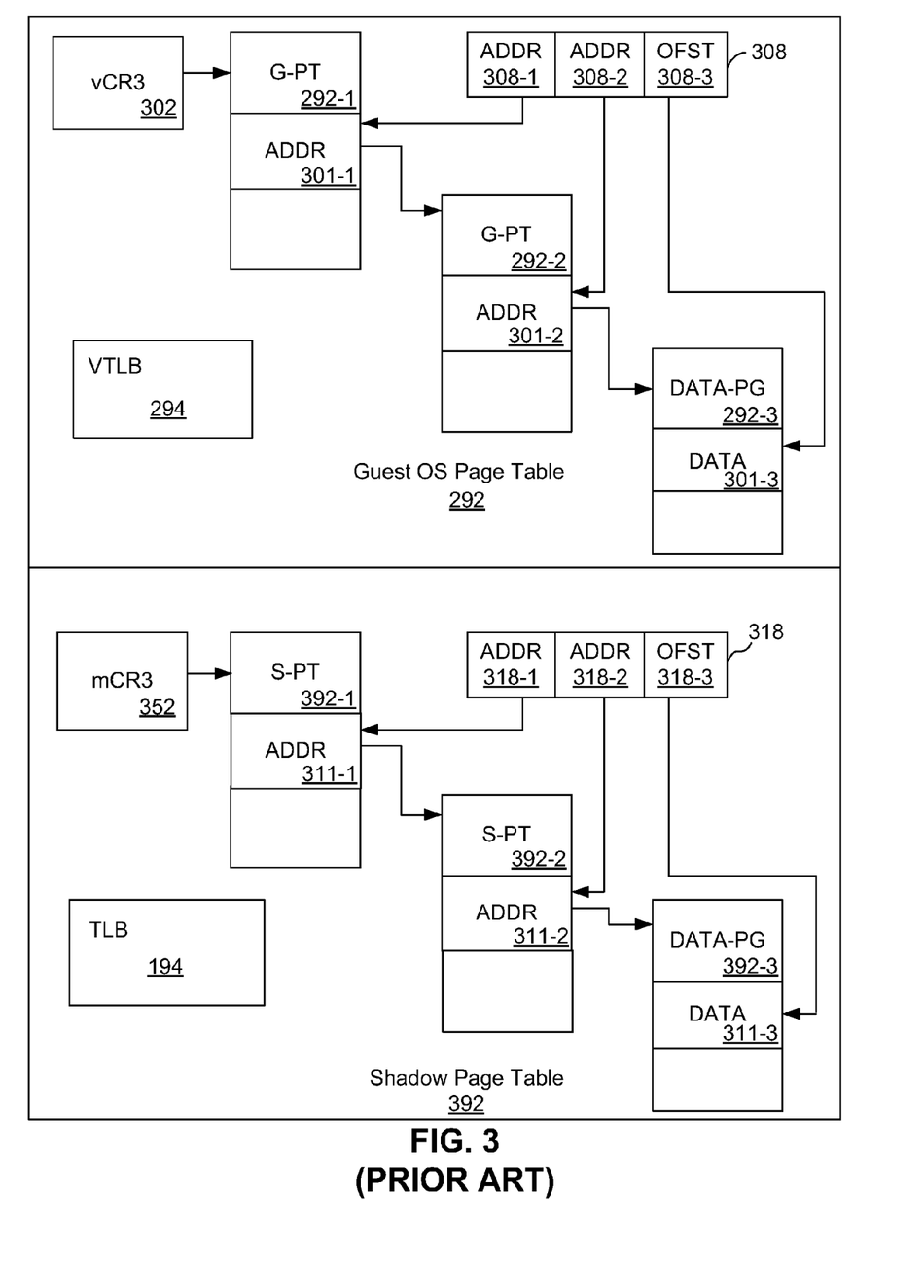
FIG. 3 illustrates the structure of the guest OS page table and the shadow page table in a virtualized computer system in more detail.

FIG. 3 illustrates the structure of the guest OS page table 292 and the shadow page table 392 in a virtualized computer system in more detail. The guest OS page tables 292 include a plurality of tables (G-PT) 292-1, 292-2 each of which includes entries 301-1, 301-2 with pages number of other guest page tables or a data page. A data page (DATA-PG) 292-3 includes data 301-3 at a guest physical address corresponding to a guest virtual address. vCR3 302 is a virtual page directory base pointer that points to the root guest page table 292-1.

In order to find the guest physical address corresponding to a guest virtual address 308 including a plurality of address fields (ADDR) 308-1, 308-2 and an offset (OFST) field 308-3, a page walk on the guest OS page table 292 is performed by walking through the guest page tables 292-1, 292-2. Specifically, the root guest page table 292-1 is accessed using the address pointed to by vCR3 302. The first address field 308-1 is an index into entry 301-1 of the root guest page table 292-1. The entry 301-1 includes a physical page number of the next guest page table 292-2, and the next address field 308-2 is an index into entry 301-2 of the guest page table 292-2. The entry 301-2 includes a physical page number of the data page 292-3. The physical address pointing to the data 301-3 corresponding to the virtual address 308 is the base address of the data page 292-3 plus the offset field 308-3. In general, a page walk on the guest OS page tables 292 presents a significant computational burden on the virtualized computer system.

The structure of the shadow page table 392 mimics that of the guest OS page table 292. The shadow page table 392 also includes a plurality of tables (S-PT) 392-1, 392-2 each of which includes entries 311-1, 311-2 with page numbers of other tables (S-PT) or a data page 392-3. A data page 392-3 includes data 311-3 at a physical (hardware) address corresponding to a guest virtual address. mCR3 352 is a hardware page directory base pointer that points to the root table (S-PT) 392-1.

In order to find the physical address corresponding to a guest virtual address 318 including a plurality of address fields (ADDR) 318-1, 318-2 and the offset (OFST) field 318-3, the CPU 110 performs a page walk on the shadow page tables 392 by walking through the shadow page tables 392-1, 392-2. Specifically, the root shadow page table 392-1 is accessed using the address pointed to by mCR3 352. The first address field 318-1 is an index into entry 311-1 of the root shadow page table 392-1. The entry 311-1 includes a PPN of the next shadow page table 392-2, and the next address field 318-2 is an index into entry 311 PPN of the data page 392-3. The hardware address pointing to the data 311-3 corresponding to the virtual address 318 is the base address of the data page 392-3 plus the offset field 318-3.

Note that the VTLB 294 and the TLB 194 are types of cache arrays that store mappings from GVPNs to values or data that are functions of or dependent upon the GPPNs (e.g., the GPPNs themselves or the PPNs) that are most likely to be accessed. The VMM 300 first searches for the mappings in these caches (e.g., TLB 194) given a guest virtual address, and typically performs page walks on the guest page tables 292 if no corresponding mapping corresponding to the given guest virtual address is found in these caches.

Another example of a cache (or TLB) that stores mappings from GVPNs to data or values that are functions of the GPPNs corresponding to the GVPNs is a binary translation cache. In a virtual machine, an interpreter (not shown) is typically used to repeat an execute step in a loop. Each step fetches an instruction from the memory, decodes and executes it. To fetch the instruction, the interpreter performs virtual-to-physical translation of an address pointed to by the current instruction pointer of the virtual machine, and then reads the instruction from the virtualized physical memory. The decoding phase converts space-efficient representation of the instruction to a form suitable for fast execution. When the same instruction is executed many times (e.g., is part of a loop), the instruction has to be fetched and decoded every time it is executed. Binary translation is a method of eliminating such repeated decoding. The binary translating virtual machine reads an instruction or a sequence of instructions, decodes them into "translations" and stores them in decoded form in a binary translation cache. The translations are typically indexed by the current instruction pointer of the virtual machine to eliminate the virtual-to-physical address mapping from the execution process. Thus, the translation cache typically caches a virtual-to-physical address mapping.

One advantage of the virtual-to-physical address translation mechanism in the guest operating system 220 is providing a process separation. Each process is assigned its own base page table register value (e.g., vCR3 302). When switching from one process to another, the guest operating system 220 performs an "address space switch" by loading a new value into the base page table register (e.g., vCR3 302). Loading a new value into the base page table register changes the translation of any virtual address space, so it can be used to map the same guest virtual addresses onto different guest physical addresses.

However, an address space switch may make the contents of the caches, such as the TLB 194 and the binary translation cache, stale. Therefore, whenever an address space switch occurs, the caches should be revalidated. However, revalidating the caches involves the direct cost of making a decision as to which cache entries to keep as valid and the indirect cost of revalidating the cache entries that were marked as invalid during the address space switch. One way of revalidating the caches is to mark all entries of the cache as invalid. This makes the direct cost relatively small but the indirect cost quite high. Another way of revalidating the caches is to perform a page walk for every entry in the cache and keep it if the results of the page walk coincide with the cached value. This makes the direct cost very high but eliminates the indirect cost that would have otherwise been caused by invalidating up-to-date entries. Both the direct and indirect costs associated with revalidating the caches significantly slow down the execution of the virtualized computer system.

SUMMARY OF THE INVENTION

A method and system are provided for maintaining validity of cached mappings corresponding to virtual addresses in guest page tables. The method may comprise: maintaining a cache group comprising a plurality of cache elements, each cache element comprising a plurality of caches and each cache of a cache element storing entries that are mappings from the virtual addresses to data that resolve to machine addresses corresponding to the virtual addresses; and maintaining a page table tracker array having entries for storing relationships between entries in the guest page tables and entries in the caches in the cache elements in the cache group, wherein the stored relationships in the page tracker array indicate which entries in the guest page tables are related to stored entries that map virtual addresses to machine addresses in any cache element in the cache group.

In some embodiments, maintaining the page table tracker array comprises setting each entry in the page table tracker array to comprise: a first portion representing a guest page table; a second portion representing any addresses of the guest page table identified in the first portion that are involved in the mapping of virtual addresses to machine addresses; and a third portion representing any entries in the cache group that have mappings from the virtual addresses to data that resolve to machine addresses based on the addresses identified in the second portion.

Also, in some embodiments, the method may further comprise: establishing the first portion as an address of a guest page table; establishing the second portion as a first vector of a first predetermined number of bits, where the first predetermined number of bits is the same as the number of different addresses in the guest page referenced in the first portion; and establishing the third portion as a second vector of a second predetermined number of bits, where the second predetermined number of bits is the same as the number of entries in the cache elements of the cache group.

Also, in some embodiments, the plurality of caches includes a translation look-aside buffer storing mappings from the virtual addresses to machine addresses. In some embodiments, the plurality of caches includes a binary translation cache storing mappings from the virtual addresses to instructions referenced by guest physical addresses. In some embodiments, the method further comprises, responsive to detecting a modification to a page table entry cached by at least one of the cache elements, updating a cache entry corresponding to the modified page table entry in said at least one of the cache elements.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
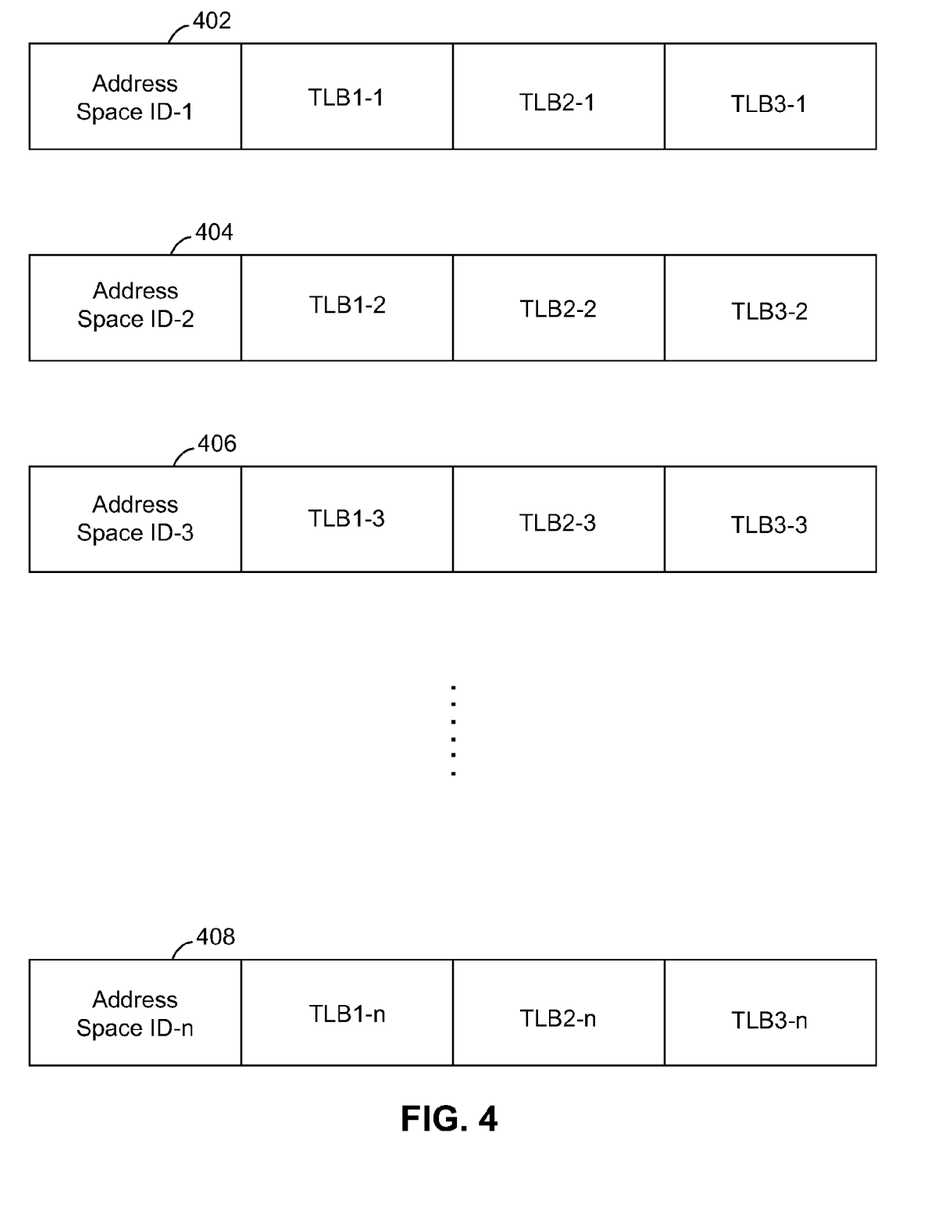
FIG. 4 illustrates a cache group including a plurality of cache elements corresponding to different address spaces, according to one embodiment of the present invention.

FIG. 4 illustrates a cache group including a plurality of cache elements 402, 404, 406, . . . , 408 corresponding to different address spaces, according to one embodiment of the present invention. Each of the cache elements 402, 404, 406, . . . , 408 corresponds to different address spaces as indicated by their respective address space IDs (Address Space ID-1, Address Space ID-2, Address Space ID-3, . . . Address Space ID-n). One example of an address space ID is the value of the guest CR3 register vCR3 302 (see FIG. 3). Each of the cache elements 402, 404, 406, . . . , 408 includes a plurality of caches or TLBs (Translation Look-aside Buffers). For example, the cache element 402 corresponds to an address space identified by Address Space ID-1, and includes the caches or TLBs (TLB1-1, TLB2-1, and TLB3-1). For another example, the cache element 406 corresponds to an address space identified by Address Space ID-3, and includes the caches or TLBs (TLB1-3, TLB2-3, and TLB3-3).

The caches or TLBs store mappings from virtual addresses to values or data that are functions of or dependent upon physical addresses corresponding to the virtual addresses, and may also be types of caches or TLBs different from each other, storing different types of mappings. The values or data that are functions of or dependent upon physical addresses corresponding to the virtual addresses can also be the physical addresses themselves. Note that the terms "physical address" and "virtual address" used herein in explaining the caches or TLBs of the present invention are intended to include "physical page number" and "virtual page number," respectively.

For example, the TLBs or caches can be the TLB 194 (See FIG. 2) in a virtualized computer system, where the TLB 194 stores mappings from guest virtual addresses to machine addresses that are functions of or dependent upon the physical addresses corresponding to the virtual addresses). For another example, the TLBs or caches may be a binary translation cache in a virtualized computer system, where the binary translation cache stores mappings from virtual addresses to instructions pointed to by the physical addresses corresponding to the virtual addresses. For still another example, the TLBs or caches may be a typical translation look-aside buffer in a virtual memory that stores mappings from virtual addresses to physical addresses. For still another example, the TLBs or caches may be an I/O cache storing mappings from virtual addresses to physical addresses on an I/O path of the guest operating systems 220.

The number of cache elements 402, 404, 406, 408 may be different from, and is typically less than, the number of address spaces. Because the number of address spaces may exceed the number of cache elements, a hashing and/or LRU (least recently used) scheme may be used to map the address spaces on the cache elements 402, 404, 406, 408.

One cache element ("current cache element") of the cache group is associated with the current address space. The caches or TLBs from the current cache element are used to perform various operations dependent upon the virtual address to physical address mappings. The virtual-to-physical mappings in each of the cache elements are kept up to date, as explained below with reference to FIG. 6, so that the virtual-to-physical address mappings contained in the cache elements can be used when there is an address space change making a certain cache element the current cache element.

Figure 5:
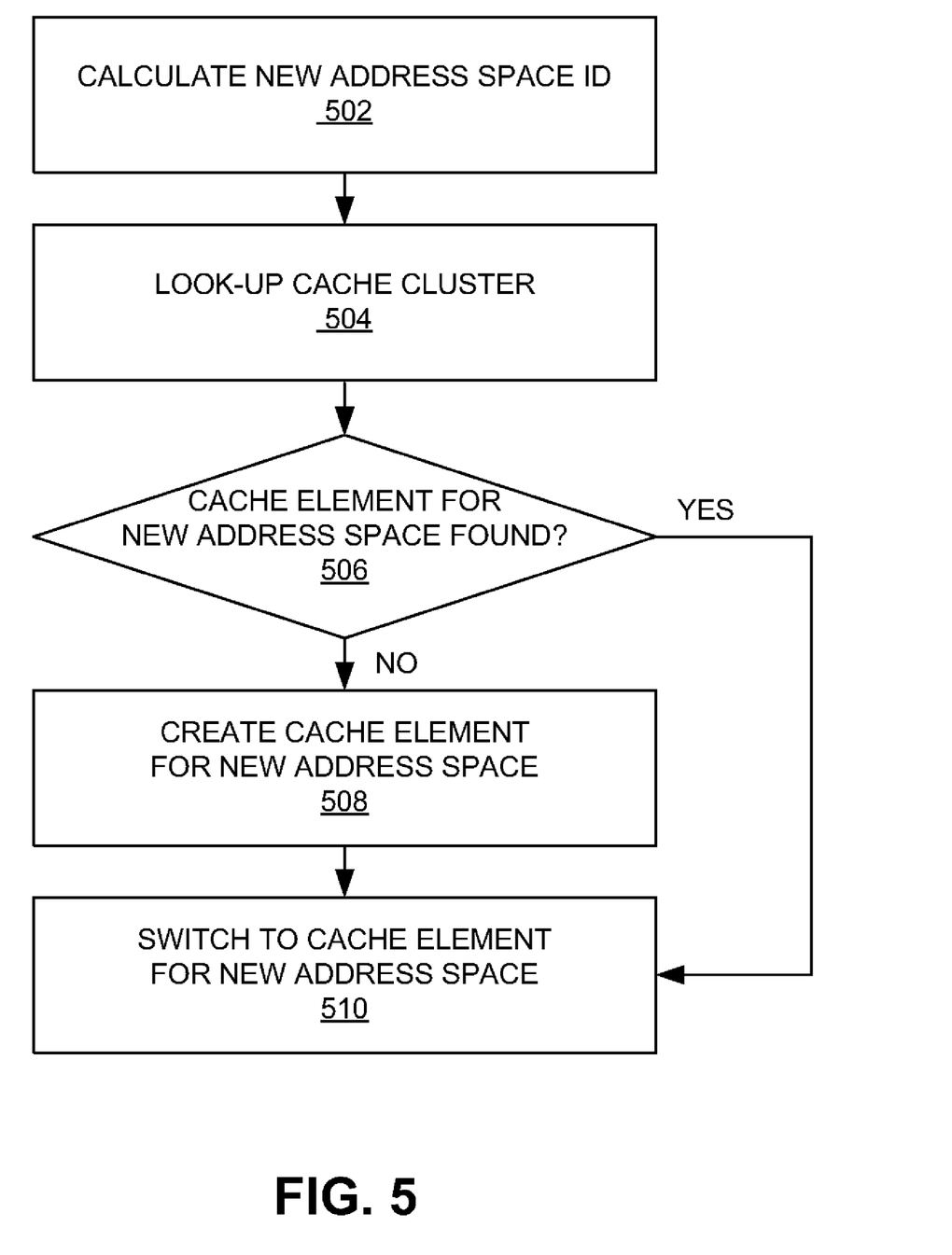
FIG. 5 is a flowchart illustrating a process of creating and utilizing the cache elements corresponding to different address spaces, according to one embodiment of the present invention.

FIG. 5 is a flowchart illustrating a process of creating and utilizing the cache elements corresponding to different address spaces, according to one embodiment of the present invention. The process of FIG. 5 will be explained herein in the context of a virtualized computer system such as that shown in FIG. 1. However, it should be noted that the present invention could also be implemented directly in a computer's primary operating system (OS), where the OS is not designed to support virtual machines. The present invention can also be implemented entirely or partially in hardware.

As the guest operating system 220 switches to a new address space, the VMM 300 calculates 502 the new address space ID for the virtual-to-physical address translations. The VMM 300 looks up 504 the cache group to find a cache element that corresponds to the new address space, as identified by the address space identifier field of the cache elements. If a cache element corresponding to the new address space is found 506, the VMM 300 makes 510 the found cache element as the current cache element for the new address space. However, if a cache element corresponding to the new address space is not found 506, the VMM 300 creates 508 a new cache element for the new address space. The new cache element is created with empty caches (TLBs), or by having the new cache element "inherit" mappings from the cache element of the previous address space by copying some of the TLB entries corresponding to the previous address space. It is possible to copy the mappings only if the mappings in both address spaces are identical, which can be verified by performing a page walk.

The advantage of inheriting is two-fold. First, since the TLB entries in the previous address space were accessed (otherwise, they would not be in the TLBs), the guest OS 220 is likely to access them again after the switch to the new address space. By inheriting the mappings for the recently accessed addresses, TLB misses are avoided. Another advantage is that it is not necessary to perform a complete page walk to establish that the mappings in both address spaces are the same. For example, if for a given address both address spaces point at the same first level page table, then it is not necessary to inspect the second level page table to establish that the address is mapped identically. Then, the VMM 300 makes 510 the newly created cache element the current cache element for the new address space and switches to the newly created cache element.

Figure 6:
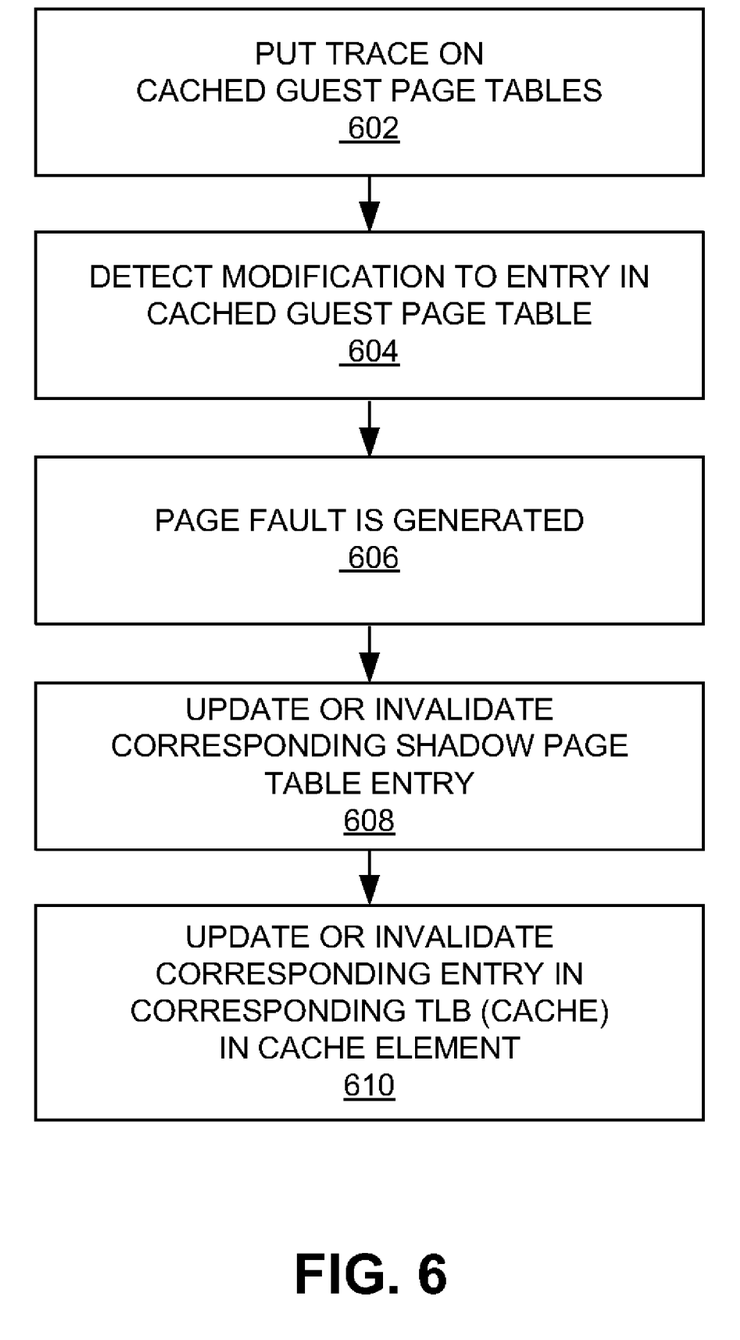
FIG. 6 is a flowchart illustrating a process of maintaining the validity of the cache elements corresponding to different address spaces, according to one embodiment of the present invention.

FIG. 6 is a flowchart illustrating a process of maintaining the validity of the cache elements corresponding to different address spaces, according to one embodiment of the present invention. The process of FIG. 6 will also be explained herein in the context of a virtualized computer system such as that shown in FIG. 1.

The cache group should contain cache elements with up-to-date caches in order for the VMM 300 to use them for address translation. In the process of FIG. 6, modifications to the guest page tables 292 are monitored, and if there are changes to the guest page tables 292, then the caches in the cache elements are updated accordingly. Modifications to the guest page tables 292 can be monitored by putting "traces" 602 on the cached guest page tables 292. In one embodiment, the guest page tables 292 are traced by changing the priority bits in the shadow page tables 392 so that all cached guest page tables 292 are mapped read only. In another embodiment, the "tracing" may be done by using the cache coherency protocol of the hardware TLB (cache) 194 to detect modifications to the page table entries involved in the virtual-to-physical translation. When a modification to the page table entry in a cached guest page table 292 is detected 604, a page fault is generated 606. Note that if the cache coherence mechanism of tracing is used, then a hardware event (e.g., line invalidation in the cache of the CPU) may occur in response to the modification to the page table entry, instead of the page fault 606. The VMM 300 then updates or invalidates 608 the corresponding shadow page table entry 392 according to the modification. In addition, the VMM 300 updates or invalidates 610 the corresponding entry in the corresponding cache or TLB of the cache element for the current address space. The updating or invalidating 610 of the corresponding entry in the corresponding cache or TLB can be done immediately or deferred to a later time.

The present invention has the advantage that there is no need to regenerate caches in response to an address space switch, because multiple cache elements corresponding to different address spaces are pre-generated and stored. Therefore, virtual memory processing in a computer system according to the present invention is fast and optimized.

Figure 7A:
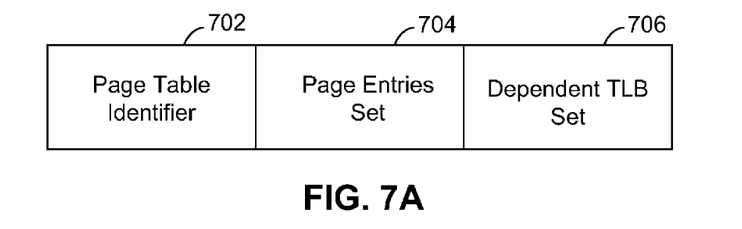
FIG. 7A illustrates the structure of a page table tracker array, according to one embodiment of the present invention.

FIG. 7A illustrates the structure of a page table tracker array, according to one embodiment of the present invention. The page table tracker array includes entries with a page table identifier 702, a page entries set 704, and a dependent TLB set 706. To keep caches in the cache group up-to-date, there is a need to store the relationship between entries in the guest page tables 292 and the entries in the caches in the cache group. Since virtual-to-physical address mapping in every entry of the TLBs or caches may depend on one or more guest page table entries, the page table tracker array of FIG. 7A is used to efficiently store such relationship. Specifically, the page table identifier 702 identifies a corresponding guest page table entry. The page entries set 704 indicates which entries in the guest page tables 292 are involved in the cached virtual-to-physical mapping in any cache or TLB in the cache group. The dependent TLB set 706 indicates which entries in the caches of the cache elements in the cache group have cached virtual-to-physical mappings based on the contents of the guest page table entry identified by the page table identifier 702.

Figure 7B:
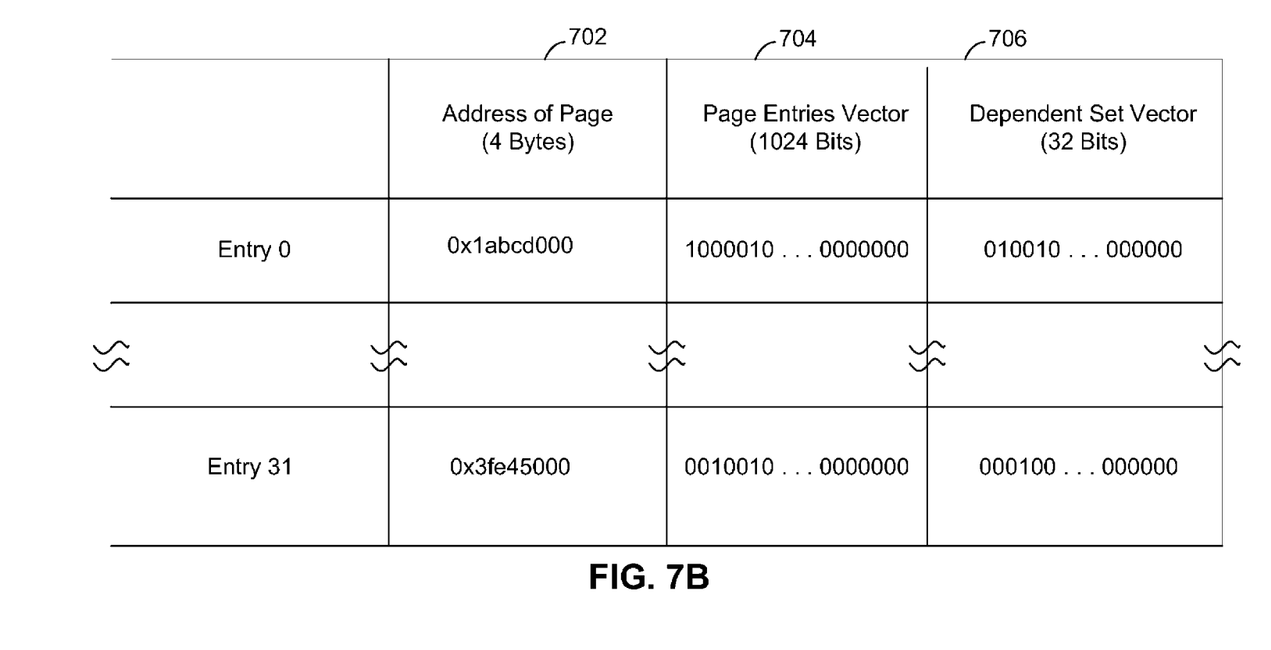
FIG. 7B illustrates examples of entries in the page table tracker array, according to one embodiment of the present invention.

FIG. 7B illustrates examples of entries in the page table tracker array, according to one embodiment of the present invention. Refer again to FIG. 7B, the page entries set 704 is implemented as a bit vector for the page entries and the dependent TLB set 706 is implemented as a bit vector for the dependent set. Because the maximum number of page entries in a page table is limited and the number of entries in the cache elements 402, 404, 406, 408 of the cache group is also limited, both bit vectors 704, 706 have a limited size. In this embodiment, each page table entry that is tracked takes only slightly more than one bit of space.

Because the number of page tables involved in virtual-to-physical mapping exceeds the number of entries in the page table tracker array, a hashing and/or LRU scheme may be employed. If an entry is removed due to conflict in the page table tracker array, all cached entries pointed to by its dependent set are invalidated. For example, a page table page in an Intel x86 architecture can have no more than 1024 entries. The pages can be referenced by their physical addresses. The data structure of FIG. 7B may be implemented for a cache group including an array of 32 cache elements and a dependent set that refers to an entire element of the cache group.

As an illustrative example, the page table tracker array of FIG. 7B is implemented in an x86 architecture. A page table page with the address 0x1abcd000 has two entries involved in virtual-to-physical mapping caching: one at index 0, the other at index 5. Two elements of the cache group are dependent on the contents of this page: one at index 2, the other at index 4. Assuming the page table entry at address 0x1abcd004 is modified, this address corresponds to the page table entry at index 1 in the page table located at address 0x1abcd000. This page table corresponds to entry 0 in the page table tracker array. Because bit 1 is not set in the page entries vector for this entry, the modification does not make any cached entry stale. Now assuming that the page table entry address 0x3fe45008 is modified (entry of index 2 in the page table 0x3fe45000), the matching entry in the page table tracker array is entry 31, and bit 2 is set in the page entries vector. The dependent set vector has bit 3 set, so the cached element at index 3 is marked as stale. This means that during the next address space switch to an address space corresponding to a cached element 3, all virtual-to-physical caches are going to be treated as stale.

Figure 8:
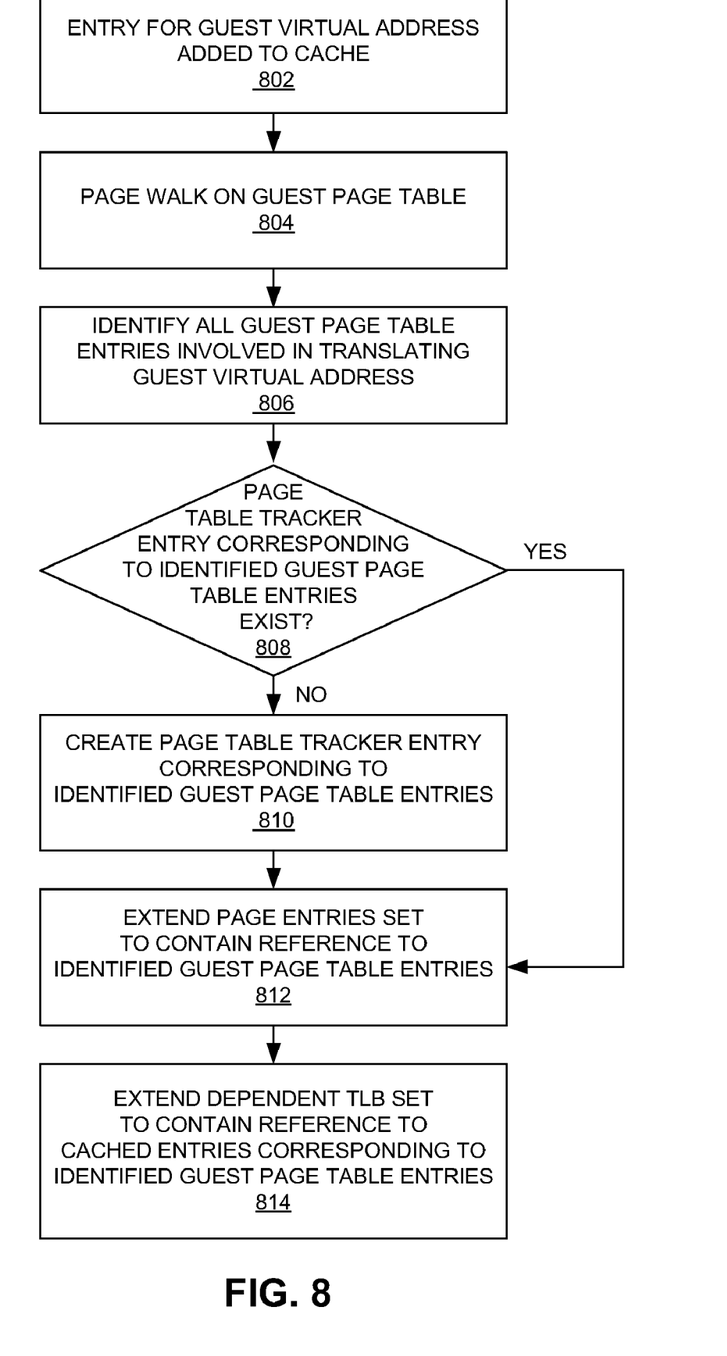
FIG. 8 is a flowchart illustrating a process of filling the page table tracker array, according to one embodiment of the present invention.

FIG. 8 is a flowchart illustrating a process of filling the page table tracker array, according to one embodiment of the present invention. If an entry for a guest virtual address VA is added 802 to a cache in one of the cache elements, the VMM 300 performs a page walk 804 on the guest page table 292 and identifies 806 all guest page table entries involved in translating the virtual address VA. Then, for every such identified guest page table entries, the VMM 300 locates 808 a corresponding entry in the page table tracker array. If the entry exists, then step 810 is skipped and the process goes to step 812. If the entry does not exist in the page table tracker array, the VMM 300 creates 810 a new entry in the page table tracker array, and makes both the page entries set 704 and the dependent TLB set 706 empty in the new entry of the page table tracker array. Then, the VMM 300 extends 812 the page entries set to include the references to the identified page table entries, and also extends 814 the dependent TLB set to include the references to the cached entries corresponding to the identified guest page table entries. Note that all the steps 808, 810, 812, 814 are preferably performed for the guest page table entries identified in step 806, sequentially or in parallel. In other words, steps 808, 810, 812, 814 are performed for one of identified page table entries, and steps 808, 810, 812, 814 are repeated for another one of the identified page table entries, and so on, which can be sequential or in parallel.

Figure 9:
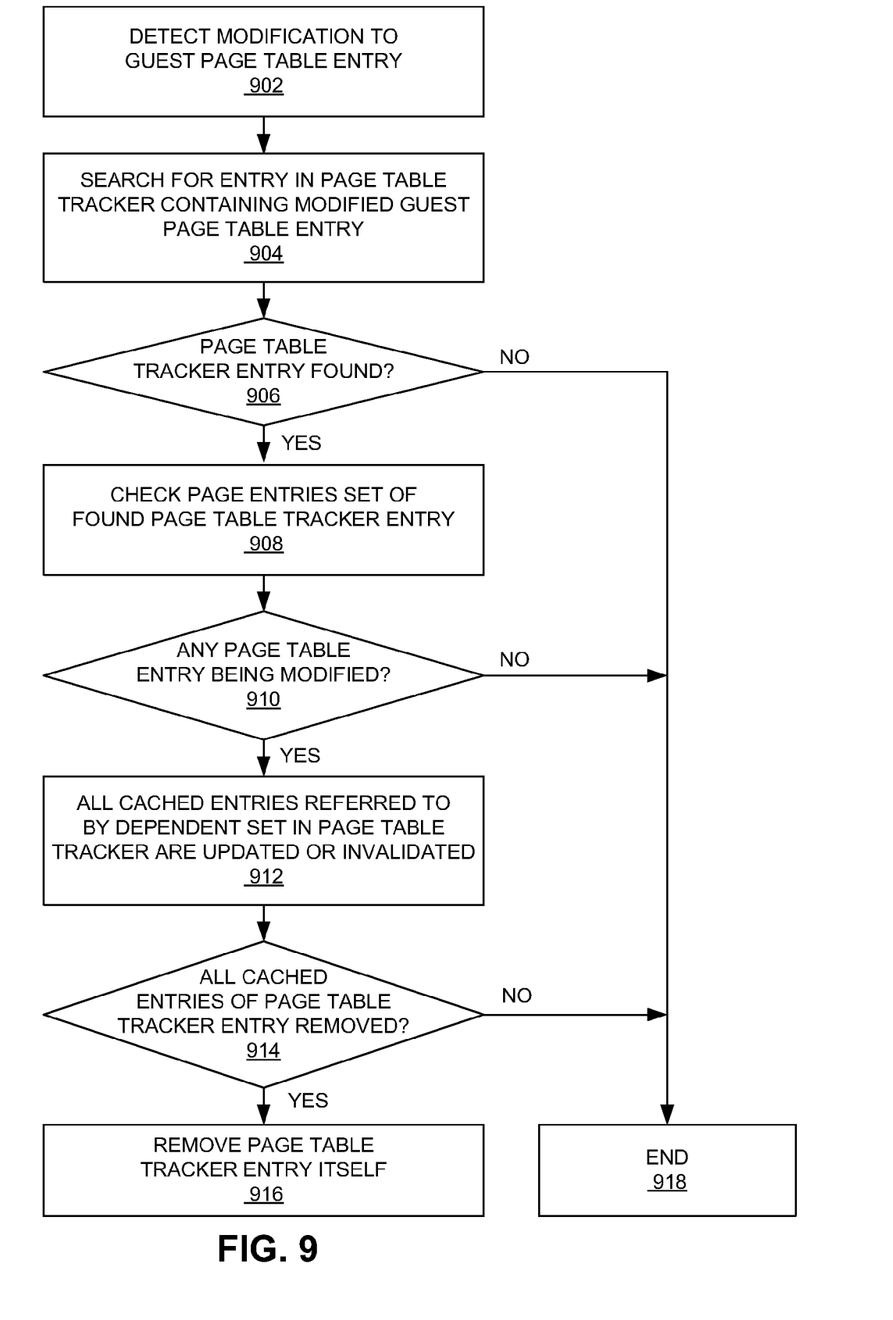
FIG. 9 is a flowchart illustrating a process of maintaining the page table tracker array synchronized with the page tables, according to one embodiment of the present invention.

FIG. 9 is a flowchart illustrating a process of maintaining the page table tracker array synchronized with the page tables, according to one embodiment of the present invention. If a modification to the guest page table 292 is detected 902, the VMM 300 searches 904 for an entry in the page table tracker array containing the modified guest page table entry. If an entry is not found 906, the VMM 300 does not take any further action and the process ends 918. If an entry is found 906, the VMM 300 checks the page entries set 704 of the found page table tracker entry. If the page entries set 704 does not refer to any page table entry being modified (step 910), the VMM 300 does not take any further action the process ends 918. If the page entries set 704 does refer to a page table entry being modified (step 910), the VMM 300 updates or invalidates 912 all cached entries referenced by the dependent TLB set 706 of the found page table tracker entry. If all cached entries corresponding to this page table tracker entry are removed (step 914), the VMM 300 can remove 916 the page table tracker entry itself; otherwise the process ends 918.

Figure 10:
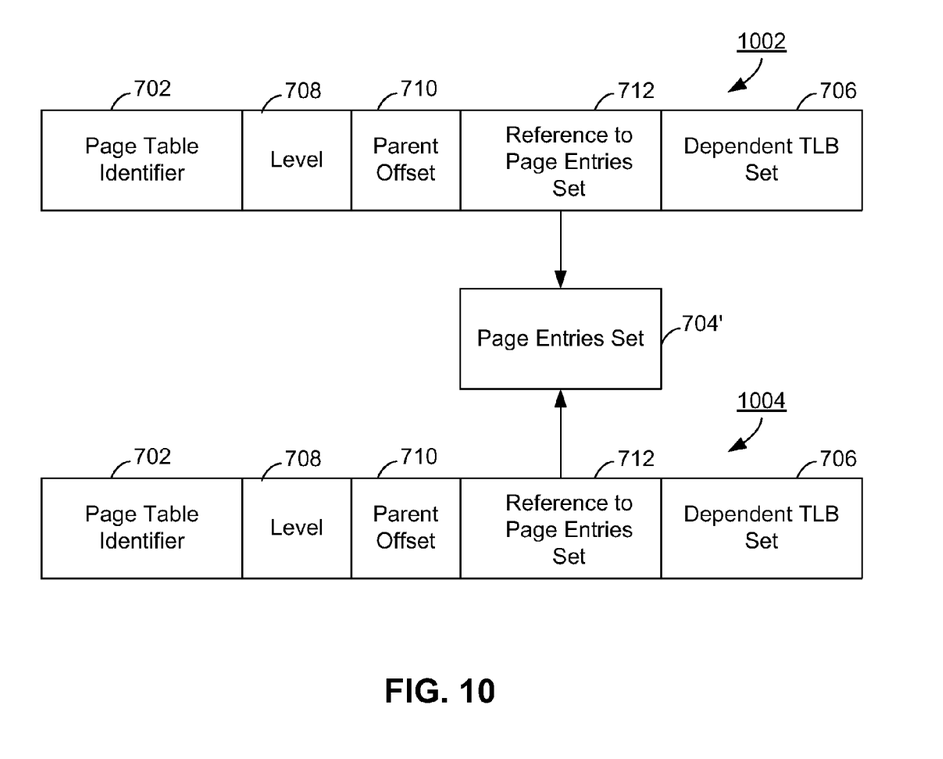
FIG. 10 illustrates the structure of a page table tracker array that can be shared between different address spaces, according to another embodiment of the present invention.

FIG. 10 illustrates the structure of a page table tracker array that can be shared between different address spaces, according to another embodiment of the present invention. Two instances 1002, 1004 of the page tracker array are shown in FIG. 10, and each page tracker array 1002, 1004 correspond to a different address space. Each of the page table tracker arrays 1002, 1004 includes a page table identifier 702, a level field 708, a parent offset field 710, a reference 712 to page entries set, and a dependent TLB set 706. The level field 708 indicates at which step of a guest page walk the guest page table was accessed. In other words, the level field 708 indicates which section of the virtual is used to index into the guest page table. The parent offset field 710 is an index of the page table entry in the other page table (parent page table) that references this current page identified by the page table identifier 702 during the page walk process. The reference 712 to page entries set contains a reference to the shared page entries set 704'. The dependent TLB set 706 is same as that shown in FIG. 7A.

Some workloads may have many page tables that are registered in the page table tracker array. One example is a workload with many active processes. Allocating even one bit per page table entry may use too much space for these workloads. Thus, in order to save memory space, the page table tracker array of FIG. 10 identifies the page tables that are likely to have similar page entries set, and such identified page tables share their page entries sets 704. Typically, the processes in many operating systems usually have similar memory layouts. If there is code at a given virtual address interval in one address space, it is likely that there is (potentially different) code at this interval in other address spaces. This is especially true for the kernel portion of the address spaces that are usually shared by all processes. For every guest page table 292 registered in the page table tracker array, one can determine the subset of the virtual address space the virtual-to-physical mapping of which depends on this guest page table 292, because the level 709 and parent offset 710 are available. For example, in an Intel x86 architecture with a 32 bit non-PAE mode, the page table has level two and parent offset three if it is referenced by PDI at index 3. This page table maps all addresses with a PDI field equal to three, so its virtual address space subset in [0x00C00000, 0x00FFFFFF] is shared.

In some cases, the same page in the guest page table 292 may have different levels 708 and parent offsets 710. For those pages, the question becomes what value to put in the level 708 field of the page table tracker entry. One solution is to disallow the sharing of the page entries set 704. Another solution is to treat those pages as several pages each mapped at a single level and parent offset (i.e., allocate multiple page table entries for the same page, each entry for a different level).

Upon reading this disclosure, those of skill in the art will appreciate still additional alternative embodiments for virtual memory access through the disclosed principles of the present invention. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a virtualized computer system including a virtual memory, a computer-implemented method of maintaining validity of cached mappings corresponding to virtual addresses in guest page tables, the method comprising:

maintaining a cache group comprising a plurality of cache elements, each cache element comprising a plurality of caches and each cache of a cache element storing entries that are mappings from the virtual addresses to data that resolve to machine addresses corresponding to the virtual addresses; and maintaining a page table tracker array having entries for storing relationships between entries in the guest page tables and entries in the caches in the cache elements in the cache group, wherein the stored relationships in the page tracker array indicate which entries in the guest page tables are related to stored entries that map virtual addresses to machine addresses in any cache element in the cache group.

2. The method of claim 1, wherein maintaining the page table tracker array comprises:

setting each entry in the page table tracker array to comprise:

a first portion representing a guest page table;

a second portion representing any addresses of the guest page table identified in the first portion that are involved in the mapping of virtual addresses to machine addresses; and a third portion representing any entries in the cache group that have mappings from the virtual addresses to data that resolve to machine addresses based on the addresses identified in the second portion.

3. The method of claim 2, further comprising:

establishing the first portion as an address of a guest page table;

establishing the second portion as a first vector of a first predetermined number of bits, where the first predetermined number of bits is the same as the number of different addresses in the guest page referenced in the first portion; and establishing the third portion as a second vector of a second predetermined number of bits, where the second predetermined number of bits is the same as the number of entries in the cache elements of the cache group.

4. The method of claim 1, wherein the plurality of caches includes a translation look-aside buffer storing mappings from the virtual addresses to machine addresses.

5. The method of claim 1, wherein the plurality of caches includes a binary translation cache storing mappings from the virtual addresses to instructions referenced by guest physical addresses.

6. The method of claim 1, further comprising:

responsive to detecting a modification to a page table entry cached by at least one of the cache elements, updating a cache entry corresponding to the modified page table entry in said at least one of the cache elements.

7. A computer program product stored on a non-transitory computer readable medium and configured to perform a computer-implemented method of maintaining validity of cached mappings corresponding to virtual addresses in guest page tables in a computer system including a virtual memory, the method comprising:

maintaining a cache group comprising a plurality of cache elements, each cache element comprising a plurality of caches and each cache of a cache element storing entries that are mappings from the virtual addresses to data that resolve to machine addresses corresponding to the virtual addresses; and maintaining a page table tracker array having entries for storing relationships between entries in the guest page tables and entries in the caches in the cache elements in the cache group, wherein the stored relationships in the page tracker array indicate which entries in the guest page tables are related to stored entries that map virtual addresses to machine addresses in any cache element in the cache group.

8. The computer program product of claim 7, wherein maintaining the page table tracker array comprises:

setting each entry in the page table tracker array to comprise:

a first portion representing a guest page table;

a second portion representing any addresses of the guest page table identified in the first portion that are involved in the mapping of virtual addresses to machine addresses; and a third portion representing any entries in the cache group that have mappings from the virtual addresses to data that resolve to machine addresses based on the addresses identified in the second portion.

9. The computer program product of claim 8, the method further comprising:

establishing the first portion as an address of a guest page table;

establishing the second portion as a first vector of a first predetermined number of bits, where the first predetermined number of bits is the same as the number of different addresses in the guest page referenced in the first portion; and establishing the third portion as a second vector of a second predetermined number of bits, where the second predetermined number of bits is the same as the number of entries in the cache elements of the cache group.

10. The computer program product of claim 7, wherein the plurality of caches includes a translation look-aside buffer storing mappings from the virtual addresses to machine addresses.

11. The computer program product of claim 7, wherein the plurality of caches includes a binary translation cache storing mappings from the virtual addresses to instructions referenced by guest physical addresses.

12. The computer program product of claim 7, the method further comprising:
responsive to detecting a modification to a page table entry cached by at least one of the cache elements, updating a cache entry corresponding to the modified page table entry in said at least one of the cache elements.

13. A computer system including a storage device storing computer instructions configured to perform a computer-implemented method of maintaining validity of cached mappings corresponding to virtual addresses in guest page tables, and one or more central processing units for executing the computer instructions, the method comprising:
maintaining a cache group comprising a plurality of cache elements, each cache element comprising a plurality of caches and each cache of a cache element storing entries that are mappings from the virtual addresses to data that resolve to machine addresses corresponding to the virtual addresses; and
maintaining a page table tracker array having entries for storing relationships between entries in the guest page tables and entries in the caches in the cache elements in the cache group,
wherein the stored relationships in the page tracker array indicate which entries in the guest page tables are related to stored entries that map virtual addresses to machine addresses in any cache element in the cache group.

14. The system of claim 13, wherein maintaining the page table tracker array comprises:
setting each entry in the page table tracker array to comprise:
a first portion representing a guest page table;
a second portion representing any addresses of the guest page table identified in the first portion that are involved in the mapping of virtual addresses to machine addresses; and
a third portion representing any entries in the cache group that have mappings from the virtual addresses to data that resolve to machine addresses based on the addresses identified in the second portion.

15. The system of claim 14, the method further comprising:
establishing the first portion as an address of a guest page table;
establishing the second portion as a first vector of a first predetermined number of bits, where the first predetermined number of bits is the same as the number of different addresses in the guest page referenced in the first portion; and
establishing the third portion as a second vector of a second predetermined number of bits, where the second predetermined number of bits is the same as the number of entries in the cache elements of the cache group.

16. The system of claim 13, wherein the plurality of caches includes a translation look-aside buffer storing mappings from the virtual addresses to machine addresses.

17. The system of claim 13, wherein the plurality of caches includes a binary translation cache storing mappings from the virtual addresses to instructions referenced by guest physical addresses.

18. The system of claim 13, the method further comprising:
responsive to detecting a modification to a page table entry cached by at least one of the cache elements, updating a cache entry corresponding to the modified page table entry in said at least one of the cache elements.

* * * * *